(12) United States Patent  (10) Patent No.: US 9,927,952 B2
Estrada et al.  (45) Date of Patent: Mar. 27, 2018

(54) UTILIZING A RIBBON TO ACCESS AN APPLICATION USER INTERFACE

(75) Inventors: Theresa A. Estrada, Duvall, WA (US); Matthew D. Wood, Seattle, WA (US); Robin W. Troy, Kirkland, WA (US); Marian Kimberley S. Chua, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/478,752

(22) Filed: May 23, 2012

(65) Prior Publication Data

US 2013/0318466 A1 Nov. 28, 2013

(51) Int. Cl.
*G06F 3/0482* (2013.01)
*G06F 3/0485* (2013.01)

(52) U.S. Cl.
CPC .......... *G06F 3/0482* (2013.01); *G06F 3/0485* (2013.01)

(58) Field of Classification Search
CPC ............................ G06F 3/0482; G06F 3/0485
USPC ......................................................... 715/777
See application file for complete search history.

(56) References Cited

U.S. PATENT DOCUMENTS

| 6,232,972 | B1 * | 5/2001 | Arcuri et al. ................ 715/815 |
| 6,526,424 | B2 * | 2/2003 | Kanno .............. G06F 17/30884 |
| | | | 707/E17.114 |
| 6,678,891 | B1 * | 1/2004 | Wilcox et al. .................. 725/42 |
| 7,933,632 | B2 * | 4/2011 | Flynt ..................... G06F 3/0481 |
| | | | 340/995.1 |
| 2003/0020671 | A1 | 1/2003 | Santoro et al. |
| 2003/0160824 | A1 * | 8/2003 | Szumla ......................... 345/769 |
| 2003/0197738 | A1 * | 10/2003 | Beit-Zuri et al. ............ 345/786 |
| 2006/0036950 | A1 * | 2/2006 | Himberger et al. .......... 715/732 |
| 2007/0061714 | A1 * | 3/2007 | Stuple et al. ................. 715/529 |
| 2008/0030818 | A1 * | 2/2008 | Nagahara et al. ............ 358/537 |
| 2008/0122796 | A1 * | 5/2008 | Jobs et al. .................... 345/173 |
| 2008/0244440 | A1 | 10/2008 | Bailey |
| 2009/0006936 | A1 * | 1/2009 | Parker ................. H04L 12/1813 |
| | | | 715/200 |
| 2009/0144645 | A1 * | 6/2009 | Shneerson et al. .......... 715/765 |

(Continued)

FOREIGN PATENT DOCUMENTS

| CN | 1154061 | 6/2004 |
| CN | 1154061 C | 6/2004 |

(Continued)

OTHER PUBLICATIONS

Microsoft Office 2010: USing and Customizing the Ribbon Oct. 22, 2010 8 pages.*

(Continued)

*Primary Examiner* — Andrea Long
(74) *Attorney, Agent, or Firm* — Merchant & Gould P.C.

(57) ABSTRACT

A ribbon for accessing an application user interface may be provided. The ribbon may be displayed on a computer in association with the application user interface. The ribbon may include a horizontal scrolling gallery. The horizontal scrolling gallery may display a subset of available options which may be utilized to perform one or more actions with respect to content displayed in the application user interface. An input may be received by the computer to navigate through the available options in the horizontal scrolling gallery.

20 Claims, 14 Drawing Sheets

(56) References Cited

U.S. PATENT DOCUMENTS

| | | | |
|---|---|---|---|
| 2009/0165030 A1* | 6/2009 | Cronin | 725/14 |
| 2009/0319897 A1* | 12/2009 | Kotler et al. | 715/711 |
| 2010/0076982 A1 | 3/2010 | Gates et al. | |
| 2010/0275123 A1 | 10/2010 | Yu et al. | |
| 2010/0293470 A1* | 11/2010 | Zhao et al. | 715/732 |
| 2010/0306702 A1* | 12/2010 | Warner | 715/811 |
| 2011/0154286 A1 | 6/2011 | Falzone Schaw | |
| 2011/0197134 A1* | 8/2011 | Kulmala | 715/736 |
| 2011/0247039 A1* | 10/2011 | Cheng et al. | 725/52 |
| 2011/0265027 A1 | 10/2011 | Lipstein | |
| 2011/0302487 A1* | 12/2011 | McCormack et al. | 715/239 |
| 2012/0086650 A1* | 4/2012 | Oiwa | 345/173 |
| 2012/0159375 A1* | 6/2012 | Shaw et al. | 715/777 |
| 2013/0239001 A1* | 9/2013 | Maloney et al. | 715/732 |
| 2013/0326399 A1* | 12/2013 | Ferren et al. | 715/784 |

FOREIGN PATENT DOCUMENTS

| | | |
|---|---|---|
| CN | 1522413 | 8/2004 |
| CN | 101044500 | 9/2007 |
| CN | 101083584 | 12/2007 |
| CN | 101258489 A | 9/2008 |
| CN | 100590593 C | 2/2010 |
| CN | 101996185 A | 3/2011 |
| CN | 102448029 | 5/2012 |
| JP | H1153155 A | 2/1999 |
| JP | 2003513350 A | 4/2003 |
| JP | 2005197822 A | 7/2005 |
| JP | 2006059361 A | 3/2006 |
| JP | 2006074163 A | 3/2006 |
| JP | 3135581 U | 9/2007 |
| JP | 2012044698 A | 3/2012 |
| WO | 9966395 A2 | 12/1999 |
| WO | 2010132376 A2 | 11/2010 |

OTHER PUBLICATIONS

Devexpress XtraBars Features—Ribbon Features Sep. 8, 2008 5 pages.*

Scrollbar Visibility with jScrollPane Oct. 2, 2011 4 pages.*

PowerPoint 2011 Basics for Mac May 12, 2011 21 pages.*

Sinofsky, "Building Windows 8," Published Aug. 29, 2011, http://blogs.msdn.com/b/b8/archive/2011/08/26/improvements-in-windows-explorer.aspx, 10 pages.

Author Unknown, "Simplified Ribbon," Published Jun. 22, 2011, Retrieved Feb. 7, 2012, http://withinsharepoint.com/archives/168, 2 pages.

Author Unknown, "SandRibbon Features in Depth," Retrieved Feb. 7, 2012, http://www.divelements.co.uk/net/controls/sandribbon/features.aspx, 3 pages.

"International Search Report & Written Opinion for PCT Patent Application No. PCT/US2013/041035", dated Dec. 20, 2013, Filed Date: May 15, 2013, 17 pages.

"ListBox.SelectedIndex Property", Published on: Apr. 18, 2012, Available at: http://webarchive.org/web/20120418210919/http://msdn.microsoft.com/en-us/library/system.windows.forms.listbox.selectedindex.aspx.

"First Office Action Issued in China Patent Application No. 201310193383.4", dated Sep. 22, 2015, 20 Pages.

"PowerPoint for Mac 2011 Essential Training", Retrieved at <<http://www.lynda.com/PowerPoint-2011-for-mac-tutorials/essential-training/72964-2.html>>, Published on Oct. 27, 2010, 3 Pages.

"PowerPoint 2007(Version 12 SP3)", Retrieved at <<http://www.cnbeta.com/articles/159810.htm>>,Published on: Oct. 26, 2011, 3 Pages.

Chinese Office Action in Application 201310193383A, dated Mar. 10, 2016, 20 pages.

Chinese Office Action in Application 201310193383.4, dated Mar. 10, 2016, 20 pages.

"Office Action and Search Report Issued in Taiwan Patent Application No. 102116268", dated Jun. 16, 2017, 8 Pages.

"Microsoft Office for Mac 2011 tutorial: PowerPoint basics", Retrieved from <<https://web.archive.org/web/20161122015323/https://support.office.com/en-us/article/PowerPoint-for-Mac-2011-Basics-e894e597-8c29-4b41-bb65-75a4204fda2c>>, Jan. 2011, 22 Pages.

"Office Action Issued in Japanese Patent Application No. 2015-514055", dated Sep. 20, 2017, 7 Pages.

"Fifth Office Action Issued in Chinese Patent Application No. 201310193383.4", dated Oct. 24, 2017, 6 pages.

"Office Action Issued in European Patent Application No. 13730674.2", Dated Dec. 16, 2015, 7 pages.

"Third Office Action and Search Report Issued in Chinese Patent Application No. 201310193383.4", dated Sep. 23, 2016, 24 Pages.

Kiaolong, Zhang, "Foxmail 6.5 Official Version", Retrieved from <<http://www.cnbeta.com/articles/85207.htm>>, May 26, 2009, 1 Page.

"Fourth Office Action Issued in Chinese Patent Application No. 201310193383.4", Dated Apr. 5, 2017, 15 Pages.

"Office Action Issued in Japanese Patent Application No. 2015-514055", Dated Mar. 1, 2017, 7 Pages.

Xiaolong, Zhang, "Foxmail 6.5 Official Version", Retrieved from <<http://www.cnbeta.com/articles/85207.htm>>, May 26, 2009, 1 Page.

* cited by examiner

UTILIZING A RIBBON TO ACCESS AN APPLICATION USER INTERFACE

COPYRIGHT NOTICE

A portion of the disclosure of this patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many computer software applications utilize user interface (UI) ribbons and/or toolbars for selecting commands and options associated with a particular application program. For example, a word processing application may provide a ribbon UI which displays an option to select a particular font from a drop-down list for entering text into a document and which further displays a styles gallery for selecting thumbnails representing style sets for use in creating documents. One drawback associated with current ribbon UIs however, is that the selection of options often results in so many choices that their presentation obscures content which a user may have displayed in the associated application thereby detracting from the user experience. For example, the selection of a font list may result in a drop-down list which obscures more than fifty percent of a document a user is currently viewing in the application. Similarly, the selection of a style set gallery may result in the display of a grid of available style set options which obscures a portion of a currently viewed document. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for utilizing a ribbon to access an application user interface may be provided. A ribbon for accessing an application user interface may be provided. The ribbon may be displayed on a computer in association with the application user interface. The ribbon may include a horizontal scrolling gallery. The horizontal scrolling gallery may display a subset of available options which may be utilized to perform one or more actions with respect to content displayed in the application user interface. An input may be received by the computer to navigate through the available options in the horizontal scrolling gallery.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for utilizing a ribbon to access an application user interface may be provided. A ribbon for accessing an application user interface may be provided. The ribbon may be displayed on a computer in association with the application user interface. The ribbon may include a horizontal scrolling gallery. The horizontal scrolling gallery may display a subset of available options which may be utilized to perform one or more actions with respect to content displayed in the application user interface. An input may be received by the computer to navigate through the available options in the horizontal scrolling gallery.

Figure 1A:
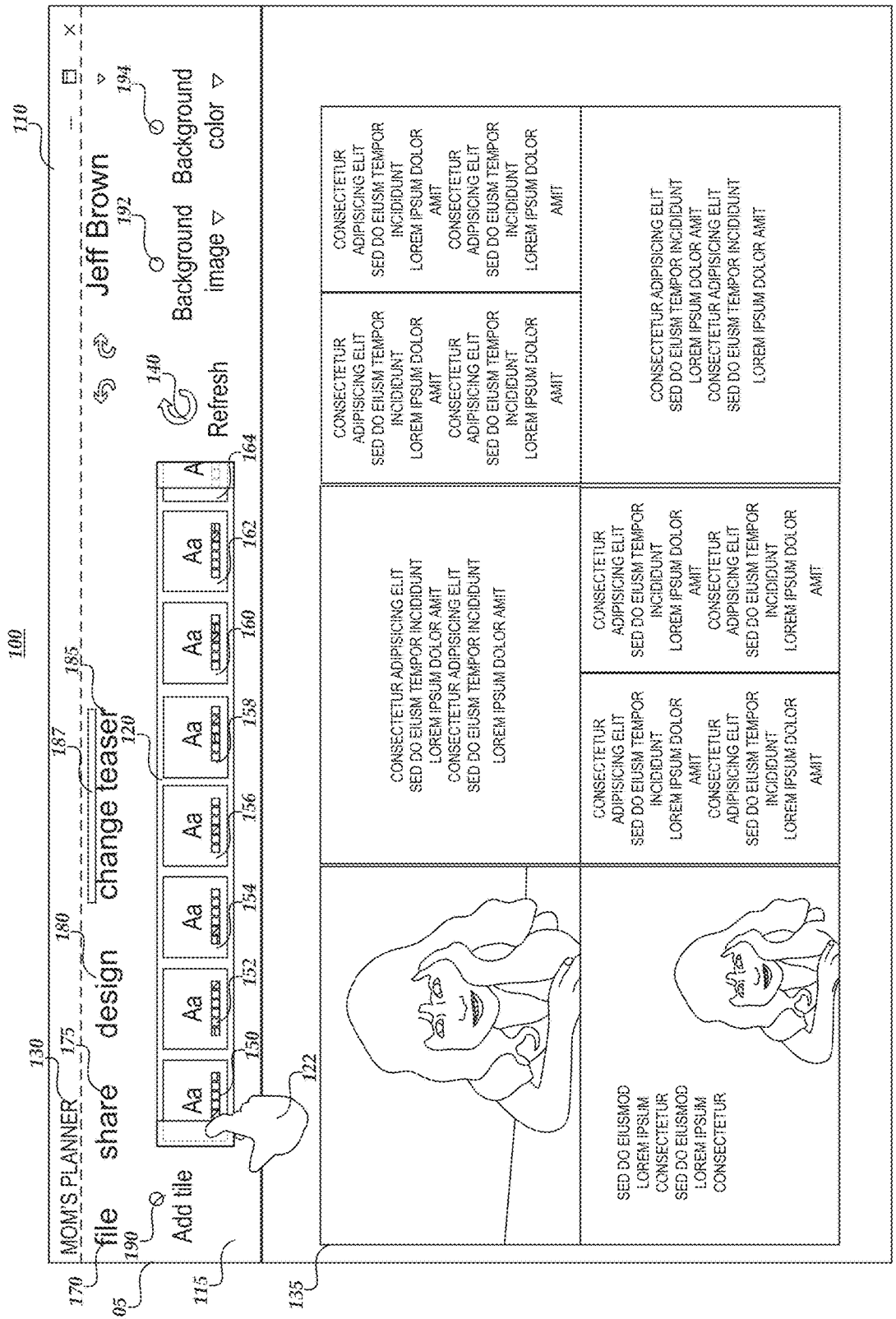
FIG. 1A shows a computer screen display of an application user interface incorporating a ribbon which includes a horizontal scrolling gallery of options for navigation via touch, in accordance with an embodiment.

FIG. 1A shows a computer screen display of an application user interface 100 incorporating a ribbon, in accordance with an embodiment. The application user interface 100 may be generated by one or more productivity applications for creating and/or editing content (e.g., documents, images, web content, etc.) which are executed on a computing device. As will be discussed in greater detail herein, the computing device may comprise a general purpose desktop, laptop, handheld, tablet, or other type of computer capable of executing one or more application programs. The application user interface 100 may include a ribbon 105 which may further include a title bar region 110 and a ribbon region 115 (which is shown, for illustrative purposes only, as being separated from the title bar region 110 by a dashed line). The title region 110 may display a title 130 which is associated with content 135 (displayed below the ribbon 105 in the application user interface 100). In accordance with an embodiment, the content 135 may contain a variety different types of content (e.g., text and/or images, web content, etc.) which is displayed as a "montage" of interactive tiles on a content surface.

The ribbon region 115 may display a horizontal scrolling gallery (hereinafter "the gallery") 120. The gallery 120 may be utilized to navigate and select a number of options (such as the subset of gallery options 150, 152, 154, 156, 158, 160, 162 and 164) for performing one or more actions with respect to the content 135 in the application user interface 100. For example, the gallery 120 may comprise a themes gallery for the selection of different style options to apply formatting (e.g., specially colored and shaded blocks of text, and customized headings and lists) to the content 135. It should be understood that the aforementioned gallery examples are illustrative only and that one skilled in the art should appreciate that the gallery 120 may be utilized for displaying any number of options which may be selected and utilized to perform any number of actions in the application user interface. The gallery 120 may be horizontally scrolled "in-place" via a gesture (e.g., a touch input using hand 122) or by using a stylus. It should be understood that the gallery 120 may include additional available options which are hidden from view (these additional available options would become visible as the gallery is scrolled in a left or right direction). It should be appreciated by horizontally scrolling "in-place," the gallery 120 conserves valuable screen area on mobile computing devices having limited display space (such as tablets) by allowing a user to view all of the available options without further expanding the gallery into the limited available space. The ribbon region 115 may also include a number of tabs (such as tabs 170, 175, 180 and 185) which may be utilized to select various options associated with the application user interface. It should be understood that the tabs 170-185 may include basic tabs (i.e., the tabs 170, 175 and 180) and one or more contextual tabs (i.e., the tab 185). It should further be understood that basic tabs are always displayed in the ribbon 105 while contextual tabs may only be displayed based on a particular piece of content being selected in the application user interface. The selection of any of the tabs 170-185 may also be emphasized in the ribbon 105 such as through highlighting, shading or coloring. In addition, the display of contextual tabs may be further emphasized by the appearance of a bar over the tab name (e.g., the bar 187 over the tab 185). The ribbon region 115 may further include refresh control 140 which may be utilized to update the options in the gallery 120. For example, the selection of the refresh control 140 may cause updated gallery options to be populated into the gallery 120 from a remote server. The ribbon region 115 may further display icons 190, 192 and 194 which, when selected, execute additional options (e.g., adding a tile and adding/changing background images and colors) in the application user interface 100. It should be understood that in accordance with the various embodiments described herein, the display of the refresh control 140 and the icons 190, 192 and 194 are not required and thus the ribbon 105 may exclude the aforementioned options.

Figure 1B:
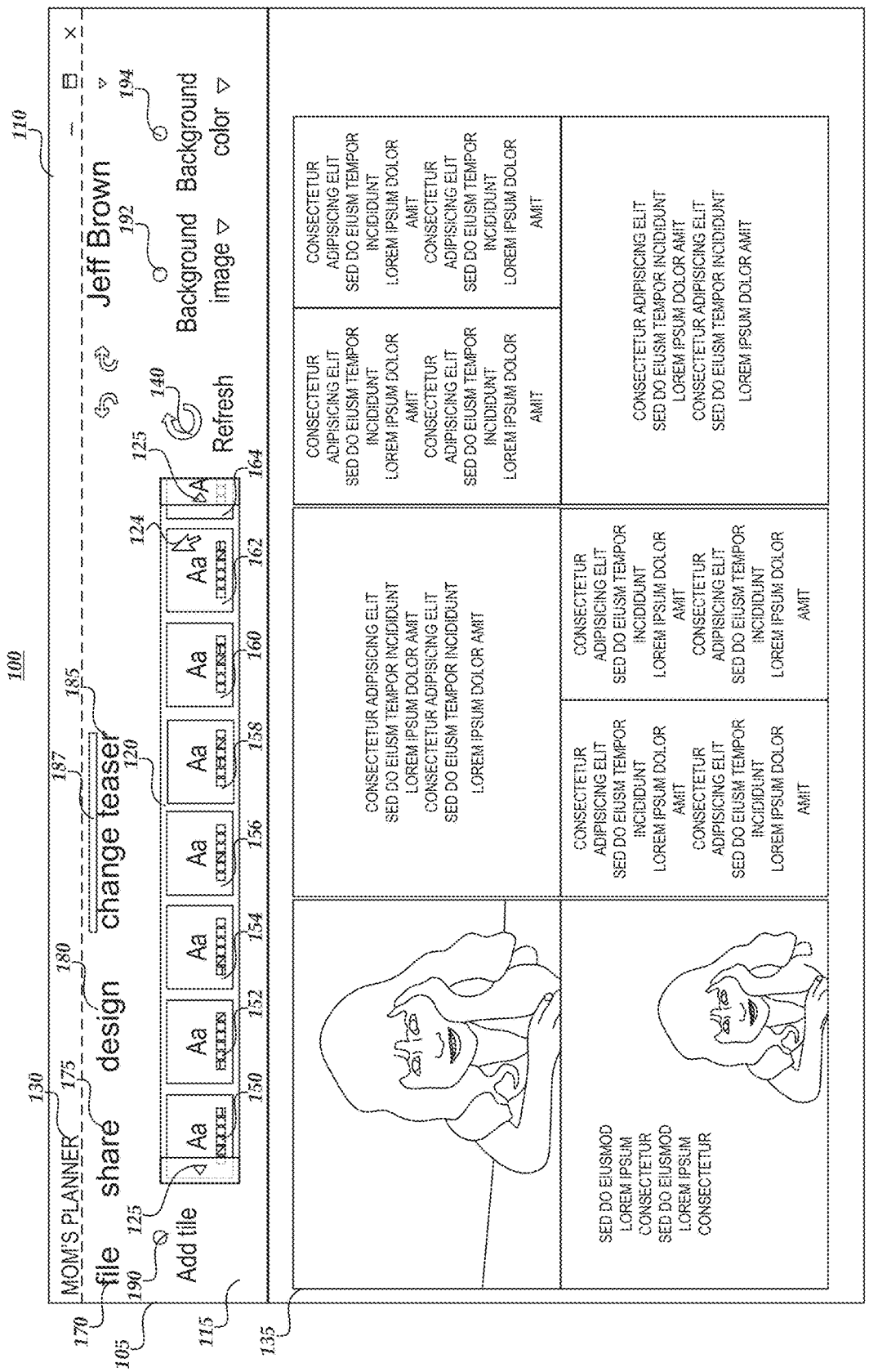
FIG. 1B shows a computer screen display of an application user interface incorporating a ribbon which includes a horizontal scrolling gallery for navigation via a pointing device, in accordance with an embodiment.

FIG. 1B shows a computer screen display of an application user interface 100 incorporating a ribbon, in accordance with an alternative embodiment. The application user interface 100 of FIG. 1B includes many of the features described above in the discussion of FIG. 1A including the ribbon 105, the title bar region 110, the ribbon region 115, the gallery 120, the title 130, the content 135, the refresh control 140, the subset of gallery options 150, 152, 154, 156, 158, 160, 162 and 164, the tabs 170, 175, 180 and 185, the bar 187 and the icons 190-194. In addition, the application user interface 100 of FIG. 1B includes gallery scrolling paddles 125 which may be utilized to navigate available options in the gallery 120 using a pointing device (represented by device pointer 124) in communication with a computing device. It will be appreciated that the gallery scrolling paddles 125 may only be displayed upon receiving a hover action by the device pointer 124 over the gallery 120. Thus, during instances when the device pointer 124 is not interacting with the gallery 120, the gallery scrolling paddles would not be visible to a user of the application user interface 100.

Figure 2A:
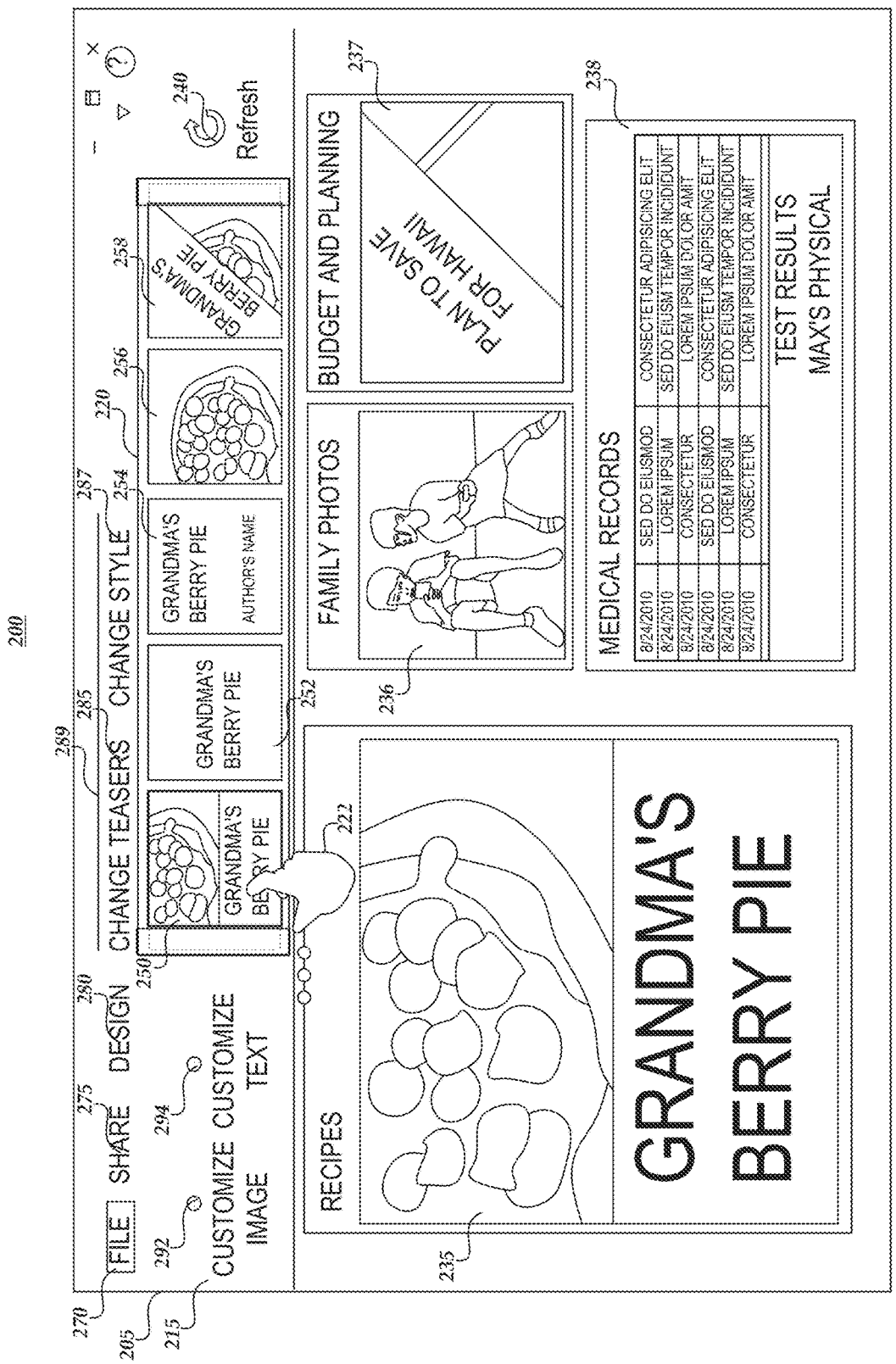
FIG. 2A shows a computer screen display of an application user interface incorporating a ribbon which includes a horizontal scrolling gallery of options for navigation via touch, in accordance with an alternative embodiment.

FIG. 2A shows a computer screen display of an application user interface 200 incorporating a ribbon, in accordance with an alternative embodiment. The application user interface 200 may be generated by one or more productivity applications for creating and/or editing content (e.g., documents, images, web content, etc.) which are executed on a computing device. The application user interface 200 may include a ribbon 205 which may further include a ribbon region 215. The ribbon region 215 may display a horizontal scrolling gallery (hereinafter "the gallery") 220. The gallery 220 may be utilized to navigate and select a number of options (such as gallery options 250, 252, 254, 256 and 258) for performing one or more actions with respect to content displayed below the ribbon 205. For example, the gallery 220 may comprise a number of "teaser" options which comprise a series of cached images for displaying montages associated with family household data. For example, the gallery option 250 may be associated with content comprising a montage including, but not limited to, a recipe 235, family photos 236, budget and planning information 237 and medical records 238. The gallery 220 may be horizontally scrolled "in-place" via a gesture (e.g., a touch input using hand 222) or by using a stylus. It should be understood that the gallery 220 may include additional available options which are hidden from view (these additional available options would become visible as the gallery is scrolled in a left or right direction). The ribbon region 215 may also include a number of tabs (such as tabs 270, 275, 280, 285 and 287) which may be utilized to select various options associated with the application user interface. It should be understood that the tabs 270-287 may include basic tabs (i.e., the tabs 270, 275 and 280) as well as contextual tabs (i.e., the tabs 285 and 287). It should further be understood that basic tabs are always displayed in the ribbon 205 while contextual tabs may only be displayed based on a particular piece of content being selected in the application user interface. The selection of any of the tabs 270-287 may also be emphasized in the ribbon 205 such as through highlighting, shading or coloring. In addition, the display of contextual tabs may be further emphasized by the appearance of a bar over the tab name (e.g., the bar 289 over the tabs 285 and 287). The ribbon region 215 may further include refresh control 240 which may be utilized to update the options in the gallery 220. For example, the selection of the refresh control 240 may cause updated options to be populated into the gallery 220 from a remote server. The ribbon region 215 may further display icons 292 and 294 which, when selected, execute additional options (e.g., customizing images and text) in the application user interface 200. It should be understood that in accordance with the various embodiments described herein, the display of the refresh control 240 and the icons 292 and 294 are not required and thus the ribbon 205 may exclude the aforementioned options.

Figure 2B:
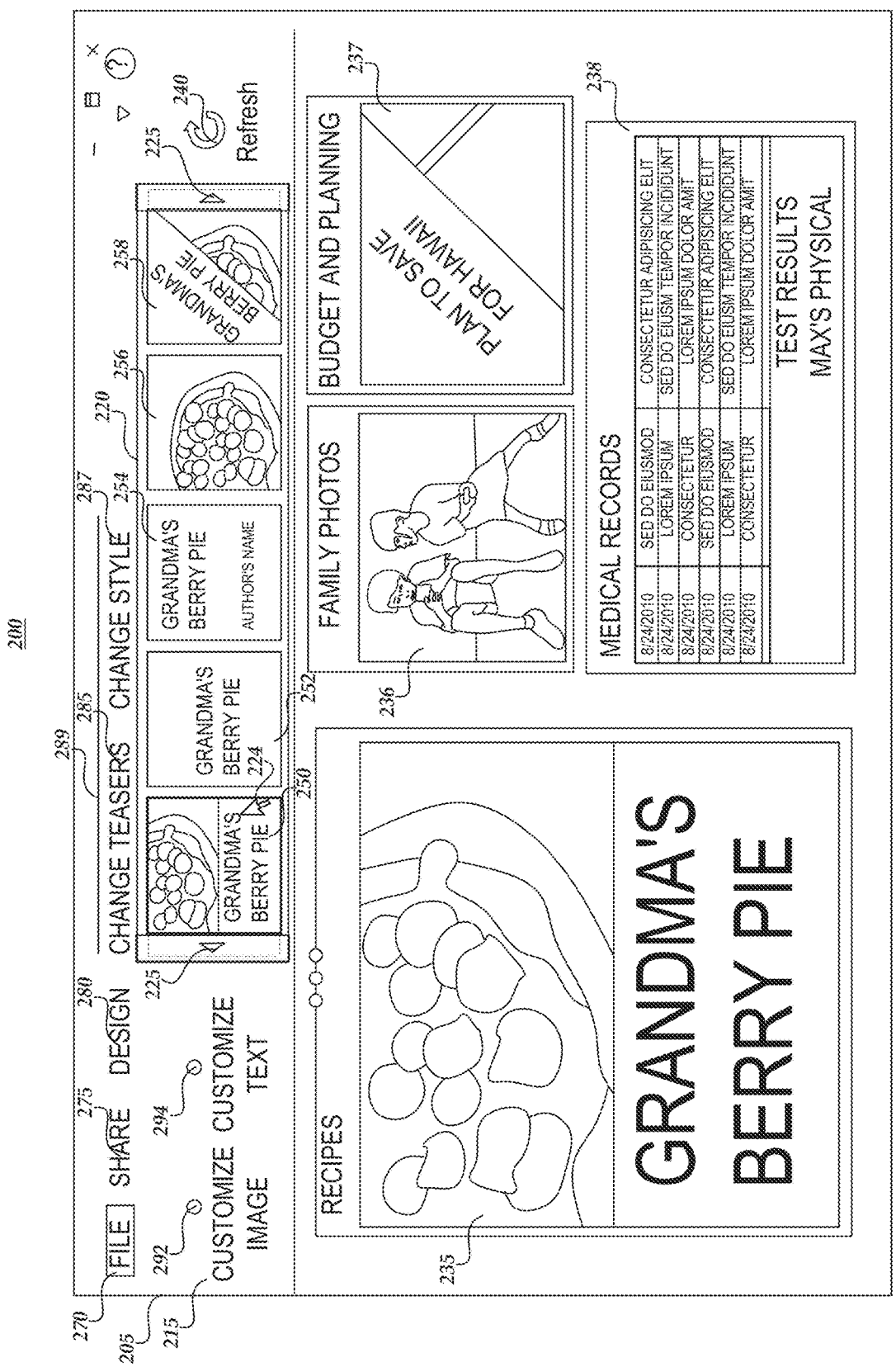
FIG. 2B shows a computer screen display of an application user interface incorporating a ribbon which includes a horizontal scrolling gallery for navigation via a pointing device, in accordance with an alternative embodiment.

FIG. 2B shows a computer screen display of an application user interface 200 incorporating a ribbon, in accordance with an alternative embodiment. The application user interface 200 of FIG. 2B includes many of the features described above in the discussion of FIG. 2A including the ribbon 205, the ribbon region 215, the gallery 220, the content 235-238, the refresh control 240, the subset of gallery options 250-258, the tabs 270-287, the bar 289 and the icons 292-294. In addition, the application user interface 200 of FIG. 2B includes gallery scrolling paddles 225 which may be utilized to navigate available options in the gallery 220 using a pointing device (represented by device pointer 224) in communication with a computing device. It will be appreciated that the gallery scrolling paddles 225 may only be displayed upon receiving a hover action by the device pointer 224 over the gallery 220. Thus, during instances when the device pointer 224 is not interacting with the gallery 220, the gallery scrolling paddles would not be visible to a user of the application user interface 200.

Figure 3A:
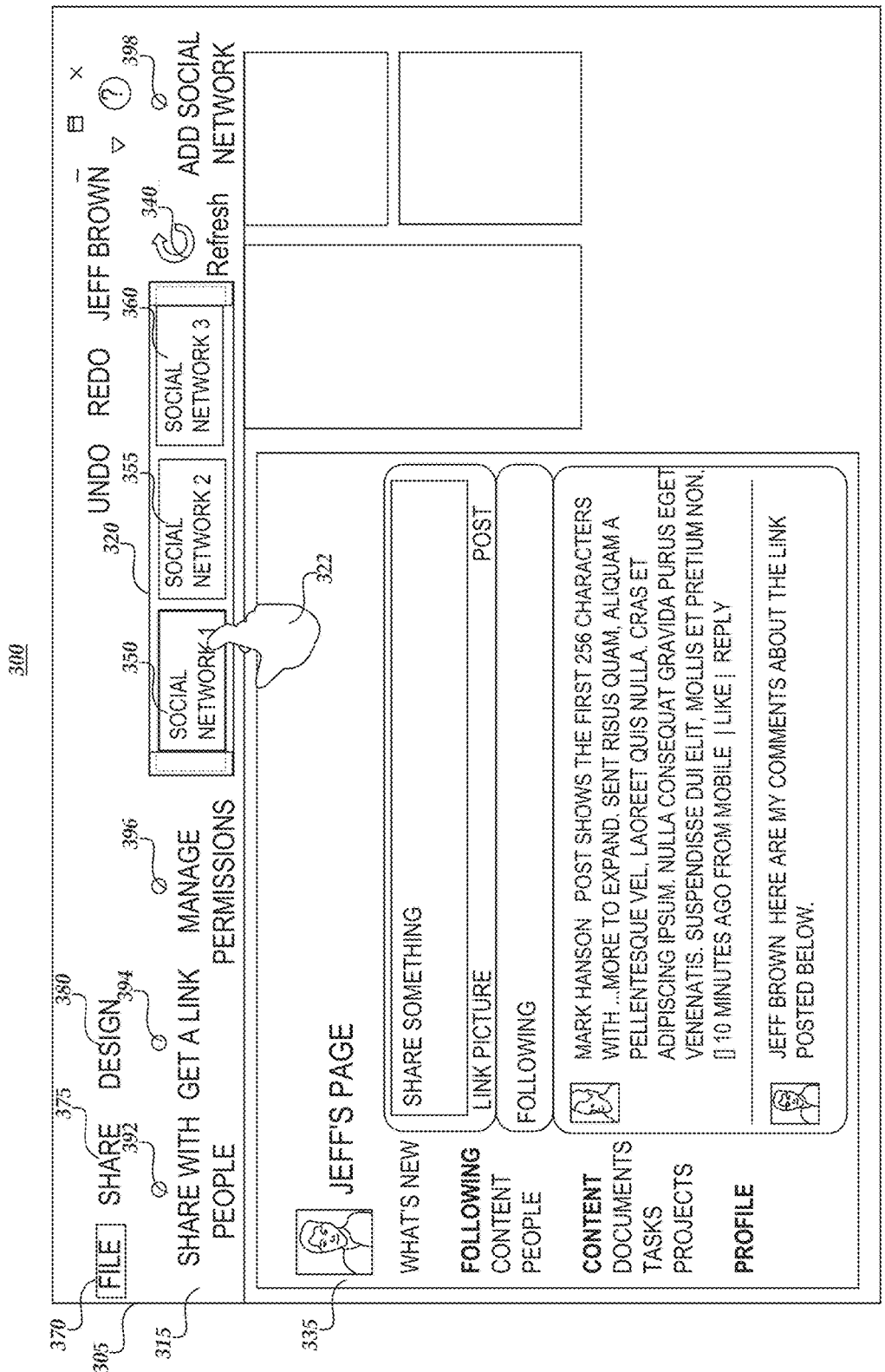
FIG. 3A shows a computer screen display of an application user interface incorporating a ribbon which includes a horizontal scrolling gallery of options for navigation via touch, in accordance with an alternative embodiment.

FIG. 3A shows a computer screen display of an application user interface 300 incorporating a ribbon, in accordance with an alternative embodiment. The application user interface 300 may be generated by one or more productivity applications for creating and/or editing content (e.g., documents, images, web content, etc.) which are executed on a computing device. The application user interface 300 may include a ribbon 305 which may further include a ribbon region 315. The ribbon region 315 may display a horizontal scrolling gallery (hereinafter "the gallery") 320. The gallery 320 may be utilized to navigate and select a number of options (such as gallery options 350, 355 and 360) for performing one or more actions with respect to content displayed below the ribbon 305. For example, the gallery 320 may comprise a number of options for accessing and displaying various social networking sites. The gallery 320 may be horizontally scrolled "in-place" via a gesture (e.g., a touch input using hand 322) or by using a stylus. It should be understood that the gallery 320 may include additional available options which are hidden from view (these additional available options would become visible as the gallery is scrolled in a left or right direction). The ribbon region 315 may also include a number of tabs (such as tabs 370, 375 and 380) which may be utilized to select various options associated with the application user interface. The selection of any of the tabs 370-380 may be emphasized in the ribbon 305 such as through highlighting, shading or coloring. The ribbon region 315 may further include refresh control 340 which may be utilized to update the options in the gallery 320. For example, the selection of the refresh control 340 may cause updated options to be populated into the gallery 320 from a remote server. The ribbon region 315 may further display icons 392, 394, 396 and 398 which, when selected, execute additional options with respect to social networking sites displayed as content 335 in the application user interface 300. It should be understood that in accordance with the various embodiments described herein, the display of the refresh control 340 and the icons 392-398 are not required and thus the ribbon 305 may exclude the aforementioned options.

Figure 3B:
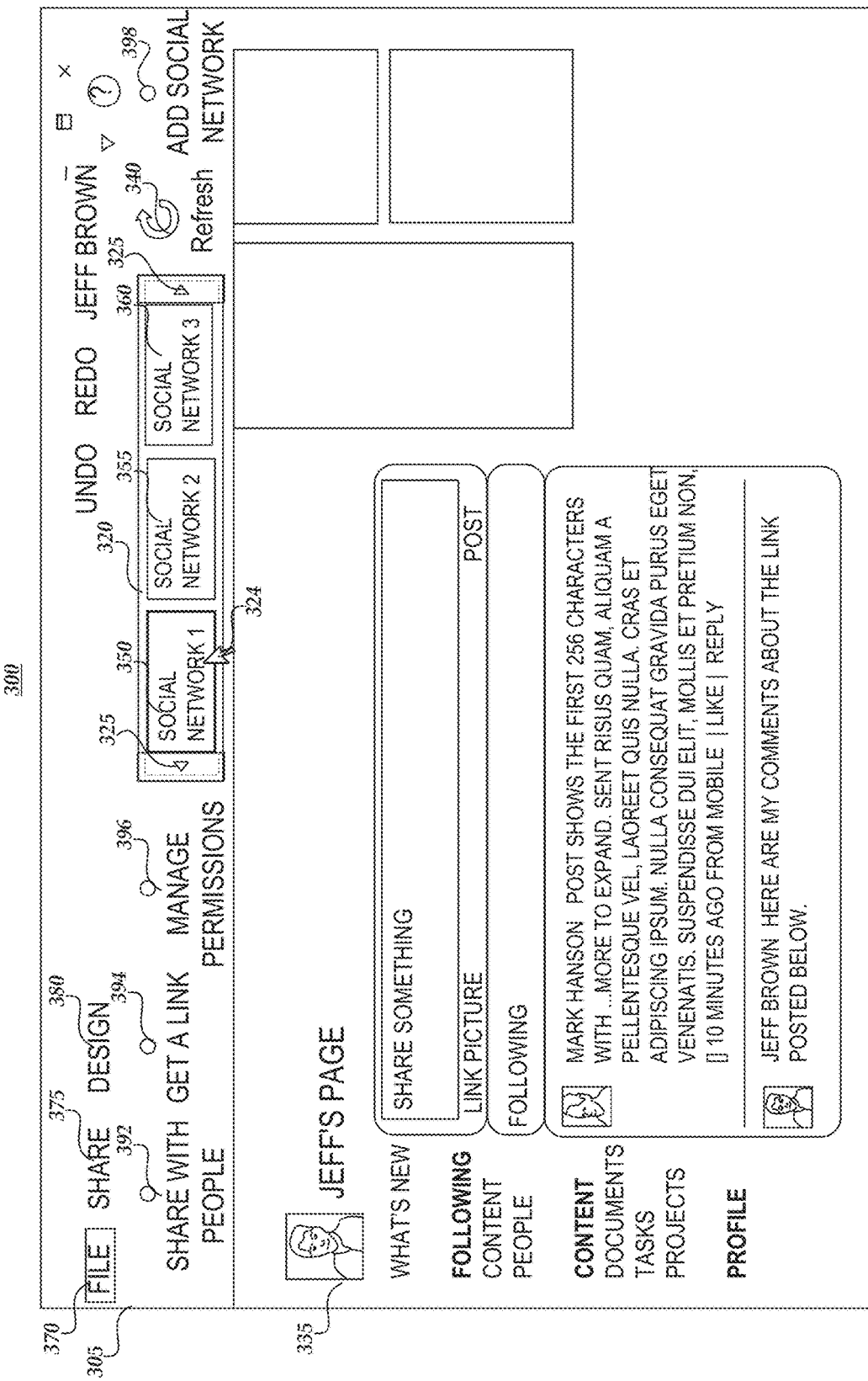
FIG. 3B shows a computer screen display of an application user interface incorporating a ribbon which includes a horizontal scrolling gallery for navigation via a pointing device, in accordance with an alternative embodiment.

FIG. 3B shows a computer screen display of an application user interface 300 incorporating a ribbon, in accordance with an alternative embodiment. The application user interface 300 of FIG. 3B includes many of the features described above in the discussion of FIG. 3A including the ribbon 305, the ribbon region 315, the gallery 320, the content 335, the refresh control 340, the gallery options 350-360, the tabs 370-380 and the icons 392-398. In addition, the application user interface 300 of FIG. 3B includes gallery scrolling paddles 325 which may be utilized to navigate available options in the gallery 320 using a pointing device (represented by device pointer 324) in communication with a computing device. It will be appreciated that the gallery scrolling paddles 325 may only be displayed upon receiving a hover action by the device pointer 324 over the gallery 320. Thus, during instances when the device pointer 324 is not interacting with the gallery 320, the gallery scrolling paddles would not be visible to a user of the application user interface 300.

Figure 4A:
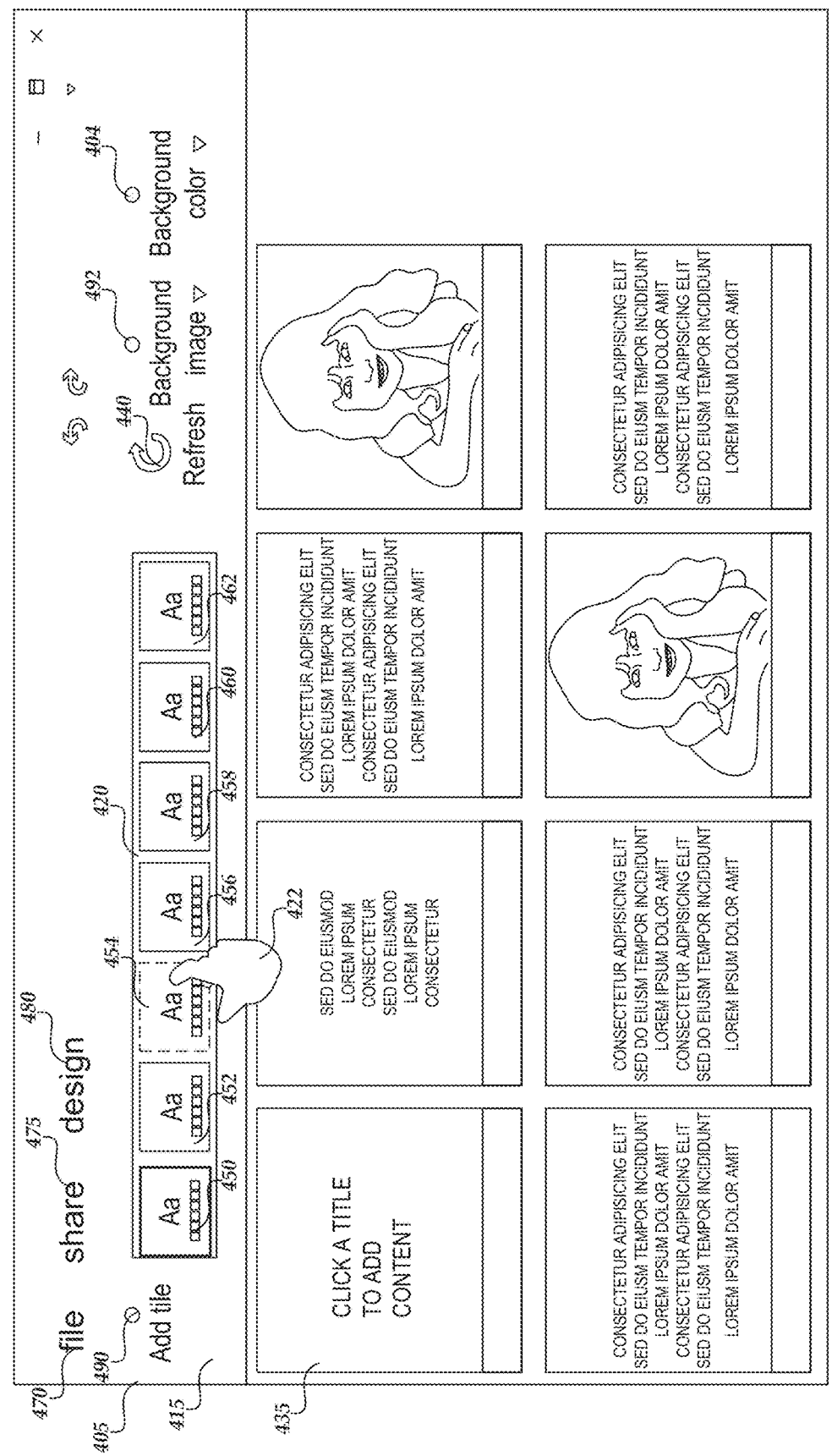
FIG. 4A shows a computer screen display of an application user interface incorporating a ribbon for selecting an available option in a horizontal scrolling gallery via touch, in accordance with an embodiment.
Figure 4B:
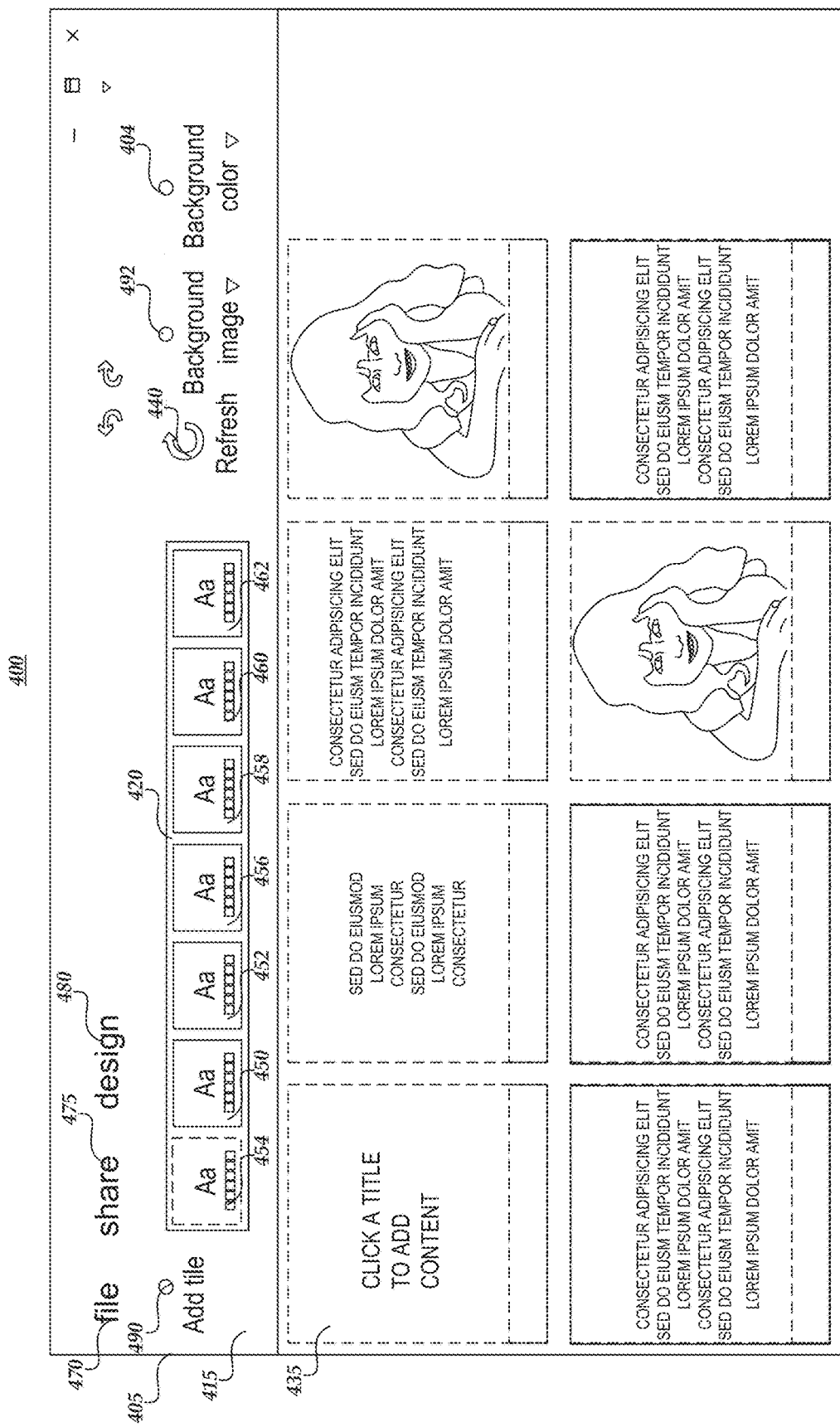
FIG. 4B shows a computer screen display of an application user interface incorporating a ribbon for reordering the display of a selected option in a horizontal scrolling gallery, in accordance with an embodiment.

FIGS. 4A and 4B show a computer screen display of an application user interface 400 incorporating a ribbon for selecting an available option in a horizontal scrolling gallery via touch and the reordering of the display of the selected available option in the horizontal scrolling gallery, in accordance with an embodiment. The application user interface 400 includes a ribbon 405 which may further include a ribbon region 415. The ribbon region 415 may display a horizontal scrolling gallery (hereinafter "the gallery") 420. The gallery 420 may be utilized to navigate and select a number of options (such as gallery options 450, 452, 454, 456, 458, 460 and 462) for performing one or more actions with respect to content 435 displayed below the ribbon 405. For example, the gallery 420 may comprise a themes gallery for the selection of different style options to apply formatting (e.g., specially colored and shaded blocks of text, and customized headings and lists) to the content 435. The ribbon region 415 may further include a refresh control 440, tabs 470, 475 and 480 and icons 490, 492 and 494. FIG. 4A shows the selection of the gallery option 454 (which is illustrated as being surrounded by dashed lines in the horizontal scrolling gallery 400), using a touch input (e.g., using hand 422) to replace the currently selected theme (i.e., gallery option 450). FIG. 4B shows the application of the gallery option 454 with respect to the content 435. In particular, the theme represented by the recently selected gallery option 454 is reflected in the content 435 being surrounded by dashed lines. Additionally, the horizontal gallery 420 shows the reordering of the gallery options such that the currently selected gallery option 454 (i.e., the currently selected theme) is shown in the first slot in the gallery. It should be understood, in accordance with an embodiment, that the gallery options are automatically reordered in the gallery so that a currently selected theme is always shown in the first gallery slot regardless of the theme's previous position in the gallery.

Figure 5:
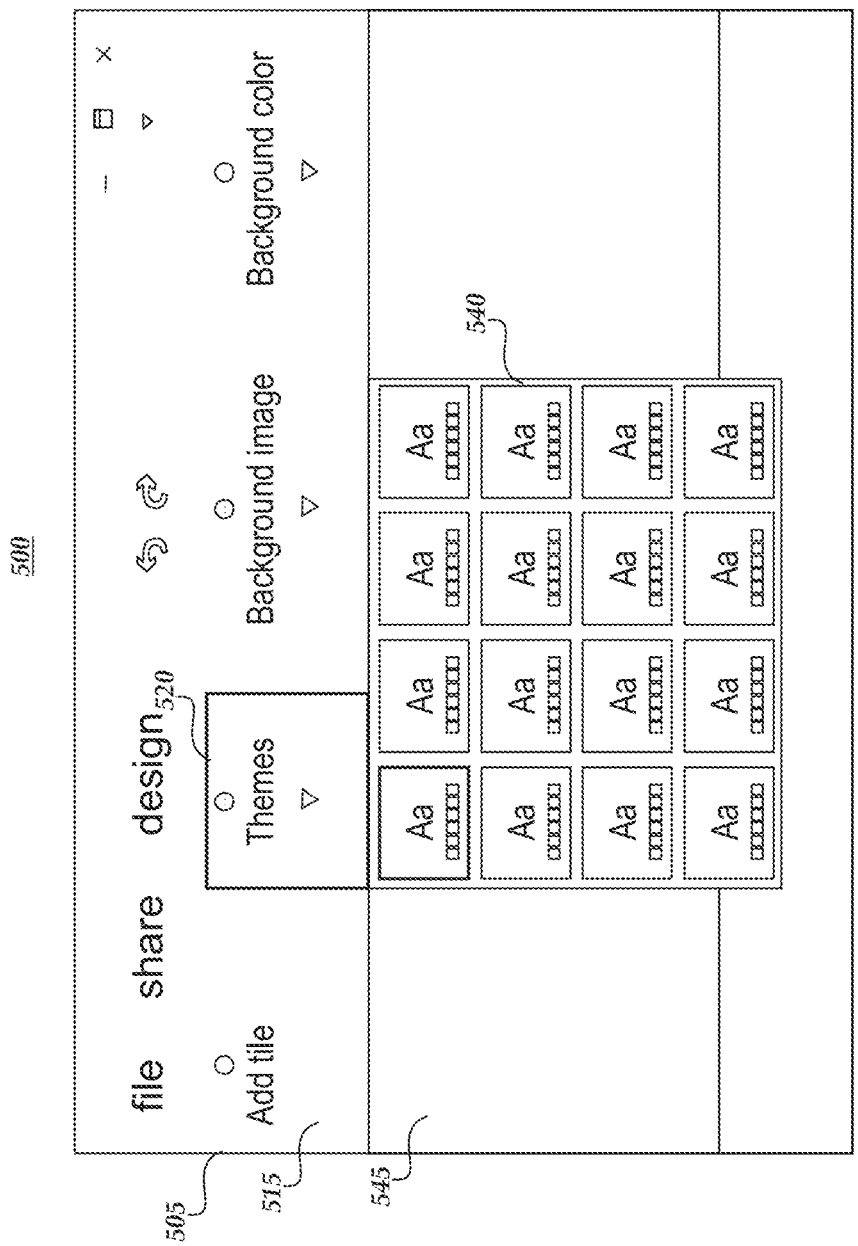
FIG. 5 shows a computer screen display of an application user interface incorporating a ribbon which includes a resized horizontal scrolling gallery for displaying available options, in accordance with an embodiment.

FIG. 5 shows a computer screen display of an application user interface 500 incorporating a ribbon which includes a resized horizontal scrolling gallery for displaying available options, in accordance with an embodiment. The application user interface 500 includes a ribbon 505 which may further include a ribbon region 515. The ribbon region 515 may display a gallery 520. As shown in FIG. 5, a window comprising the application user interface 500 has been resized to be smaller such that there is insufficient space to horizontally display two or more options in the gallery 520. As a result, the gallery 520 is displayed as a single button and the available gallery options associated with the gallery are hidden from view. In accordance with an embodiment, the available gallery options may be revealed in response to a selection of the button representing the gallery 520 (either via touch or pointing device input) resulting in the display of the available gallery options in a grid 540 which drops down (from the ribbon 505) into content area 545 in the application user interface 500.

Figure 6:
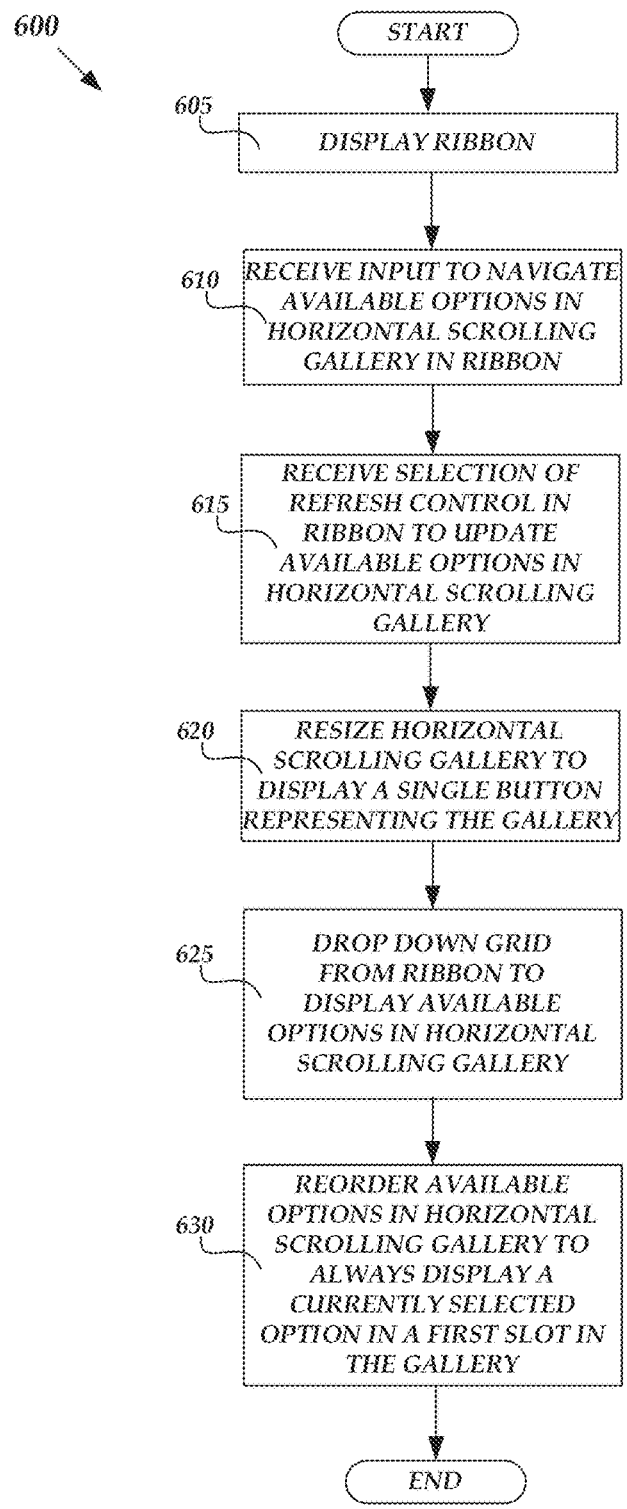
FIG. 6 is a flow diagram illustrating a routine for utilizing a ribbon to access an application user interface, in accordance with an embodiment.

FIG. 6 is a flow diagram illustrating a routine illustrating a routine 600 for utilizing a ribbon to access an application user interface, in accordance with an embodiment. When reading the discussion of the routine presented herein, it should be appreciated that the logical operations of various embodiments of the present invention are implemented (1) as a sequence of computer implemented acts or program modules running on a computing device or system, and/or (2) as interconnected machine logical circuits or circuit modules within the computing device or system. The implementation is a matter of choice dependent on the performance requirements of the computing device or system implementing the invention. Accordingly, the logical operations illustrated in FIG. 6 and making up the various embodiments described herein are referred to variously as operations, structural devices, acts or modules. It will be recognized by one skilled in the art that these operations, structural devices, acts and modules may be implemented in software, in hardware, in firmware, in special purpose digital logical, and any combination thereof without deviating from the spirit and scope of the present invention as recited within the claims set forth herein.

The routine 600 begins at operation 605, where an application executing on a computing device displays a ribbon in an application user interface generated by the application. For example, the application may generate any of the illustrative application user interfaces displaying a ribbon as discussed above with respect to FIGS. 1-5. In particular, in accordance with an embodiment, the ribbon may include a ribbon region and a title bar region. The ribbon region may display a horizontal scrolling gallery displaying a subset of available options for performing one or more actions in the application user interface and which further includes one or more contextual tabs which are displayed only upon a selection of a piece of content in the application user interface. The ribbon region may optionally display one or more icons for executing additional options in the application user interface and a refresh control to update the available options in the horizontal scrolling gallery.

From operation 605, the routine 600 continues to operation 610, where the application executing on the computing device may receive an input to navigate the available options in the horizontal scrolling gallery displayed in the ribbon. For example, the application may receive a touch input to horizontally scroll through all of the available options in the horizontal scrolling gallery as shown in FIGS. 1A, 2A and 3A. Alternatively, the application may receive a pointing device input to horizontally scroll through all of the available options in the horizontal scrolling gallery as shown in FIGS. 1B, 2B and 3B. It should be understood that if a pointing device is to be utilized to navigate the available gallery options, the application may display scrolling paddles adjacent to the horizontal scrolling gallery upon receiving a hover action by the pointing device.

From operation 610, the routine 600 continues to operation 615, where the application executing on the computing device may receive a selection of a refresh control in the ribbon to update available options in the horizontal scrolling gallery. For example, in accordance with an embodiment, a server may provide a "teaser" service which "shreds" individual pieces of content added to one or more content tiles into different pieces. For example, an electronic document may contain a filename, an author, a first paragraph, and one or more pictures. The teaser service may pull all of these content pieces out of the document and then stitch them together to create the teasers (i.e., previews of the document) that are offered to the user in the horizontal scrolling gallery. Subsequently, when a user clicks the refresh control on a client computing device providing the application user interface and the ribbon, the teaser service is called to take the content pieces (i.e., the electronic document) and run it through that teaser generation process again. It should be appreciated that, in accordance with an embodiment, the refresh control may be utilized to update the available options in the horizontal scrolling gallery after content previously added to the application user interface has been edited such that the gallery options (e.g., teasers) shown in the horizontal scrolling gallery are out of date. In accordance with another embodiment, the refresh control may be utilized to update the available options in the horizontal scrolling gallery after a user has added new content (e.g., a picture) to be used by the teaser service to generate teasers for display in the gallery. For example, if a user adds a picture of the author of an electronic document, the teaser service may use the added picture to generate teasers for the electronic document for display in the gallery.

From operation 615, the routine 600 continues to operation 620, where the application executing on the computing device may resize the horizontal scrolling gallery to display a single button representing the gallery. In particular, a user may shrink the application user interface displaying a horizontal scrolling gallery such that there is no longer sufficient area to horizontally display two or more gallery options. An illustrative resized horizontal scrolling gallery is shown in FIG. 5, discussed above.

From operation 620, the routine 600 continues to operation 625, where the application executing on the computing device may drop down a grid from the ribbon to display the available gallery options. An illustrative drop down grid displaying available gallery options is shown in FIG. 5, discussed above.

From operation 625, the routine 600 continues to operation 630, where the application executing on the computing device may reorder available options in the horizontal scrolling gallery in the ribbon such that a currently selected gallery option is always displayed in a first slot in the gallery. In particular (and as discussed in detail above with respect to FIGS. 4A and 4B), gallery options may be automatically reordered in the gallery so that a currently selected option is always shown in the first gallery slot regardless of the option's previous position in the gallery. From operation 630, the routine 600 then ends.

Figure 7:
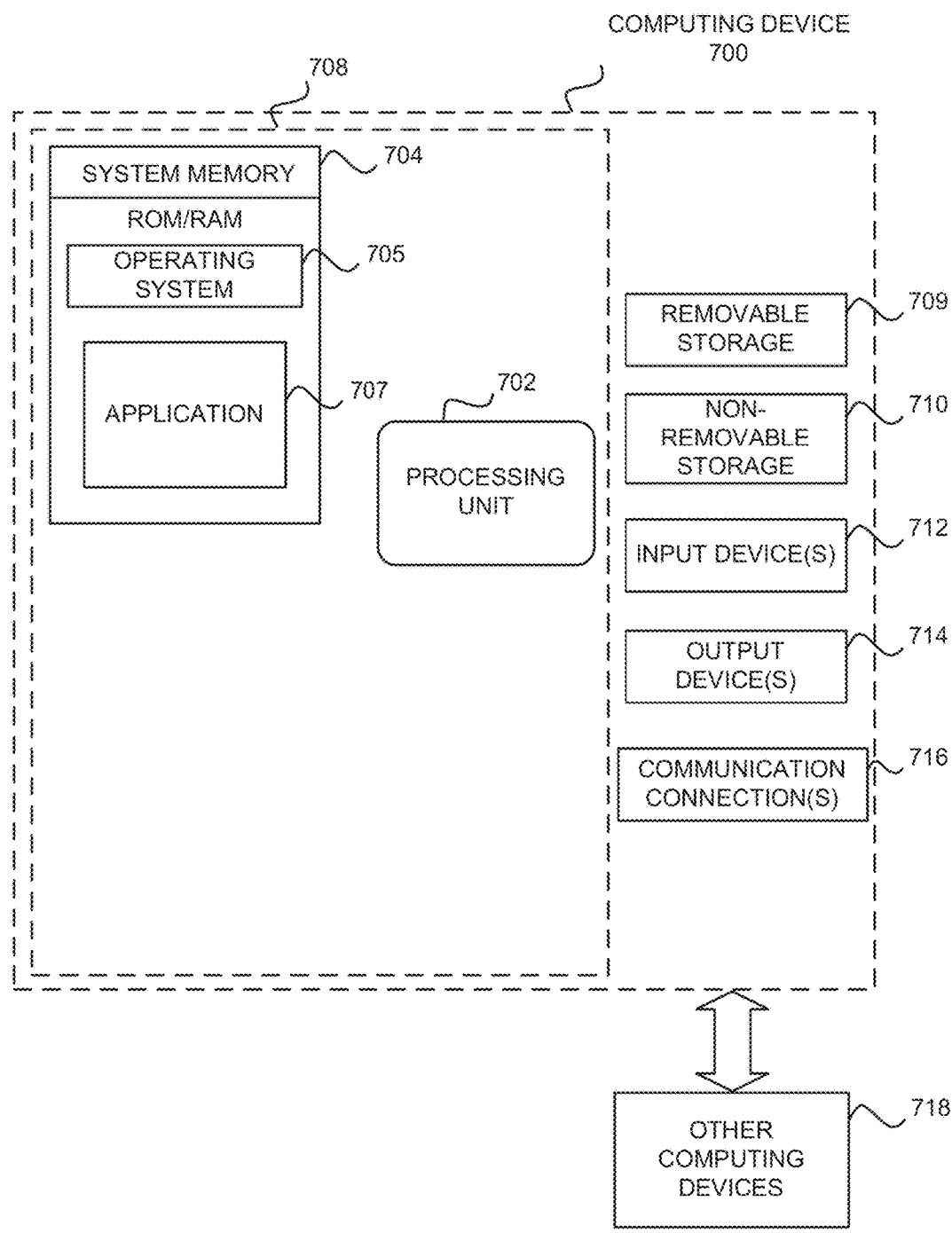
FIG. 7 is a simplified block diagram of a computing device with which various embodiments may be practiced.

FIG. 7 is a block diagram illustrating example physical components of a computing device 700 with which various embodiments may be practiced. The computing device components described below may be suitable for the computing device referenced above with respect to FIGS. 1-6. In a basic configuration, the computing device 700 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include an operating system 705 and application 707. Operating system 705, for example, may be suitable for controlling computing device 700's operation and, in accordance with an embodiment, may comprise the WINDOWS operating systems from MICROSOFT CORPORATION of Redmond, Wash. The application 707, for example, may comprise a number of different types of productivity application software including, but not limited to, word processing software, presentation graphics software, spread sheet software, diagramming software, project management software, publishing software, personal information management software and note-taking software. In accordance with an embodiment, the application 707 may comprise one or more of the following software applications: the WORD word processing software, POWERPOINT presentation graphics software, EXCEL spreadsheet software, VISIO diagramming software, PROJECT project management software, PUBLISHER publishing software, OUTLOOK personal information management software and the ONENOTE note-taking software from MICROSOFT CORPORATION of Redmond Wash. It should be appreciated that the aforementioned software applications may comprise individual application programs or alternatively, may be incorporated into a suite of applications such as the OFFICE application program suite from MICROSOFT CORPORATION. It should be understood, however, that the embodiments described herein may also be practiced in conjunction with other operating systems and application programs and further, is not limited to any particular application or system.

The computing device 700 may have additional features or functionality. For example, the computing device 700 may also include additional data storage devices (removable and/or non-removable) such as, for example, magnetic disks, optical disks, solid state storage devices ("SSD"), flash memory or tape. Such additional storage is illustrated in FIG. 7 by a removable storage 709 and a non-removable storage 710.

Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 700 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Various embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 700. Any such computer storage media may be part of the computing device 700. The computing device 700 may also have input device(s) 712 such as a keyboard, a mouse, a pen, a sound input device (e.g., a microphone for voice input), a touch input device, etc. Output device(s) 714 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
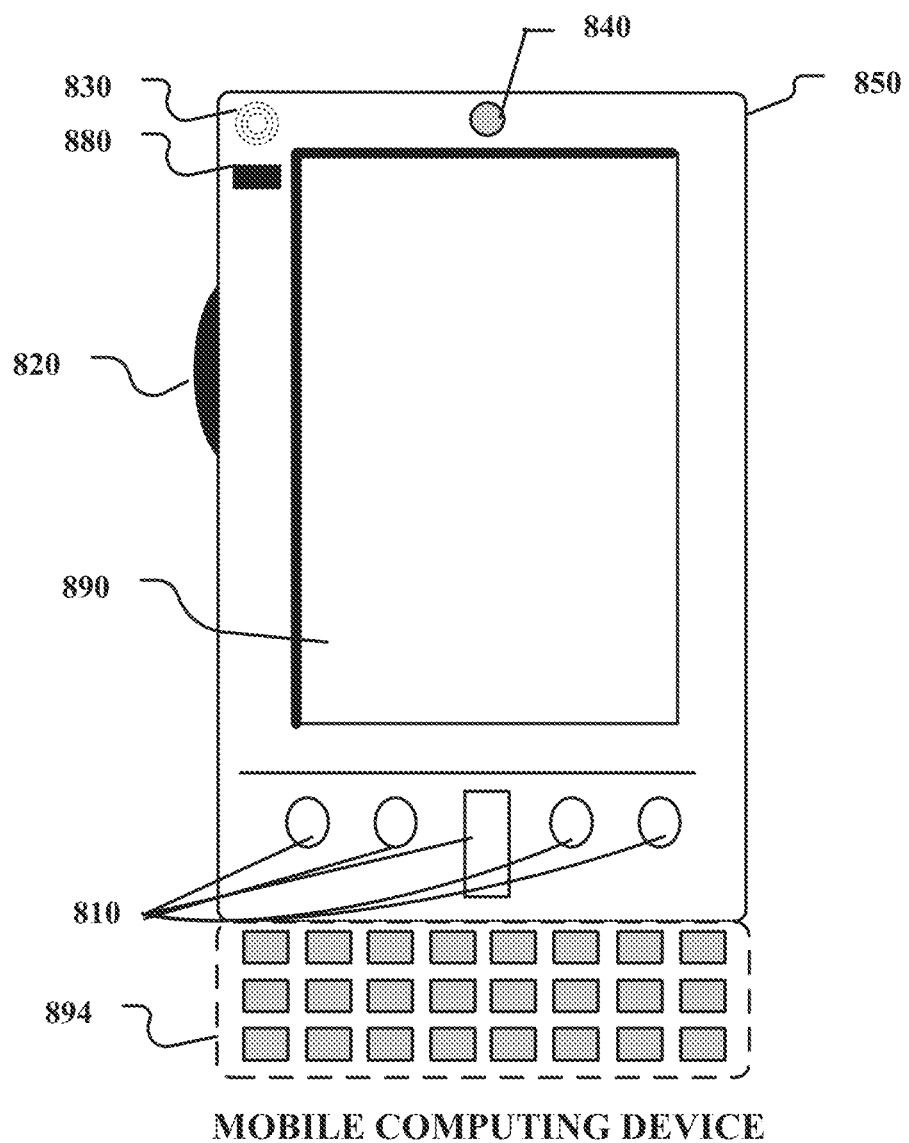
FIG. 8A is a simplified block diagram of a mobile computing device with which various embodiments may be practiced.
Figure 8B:
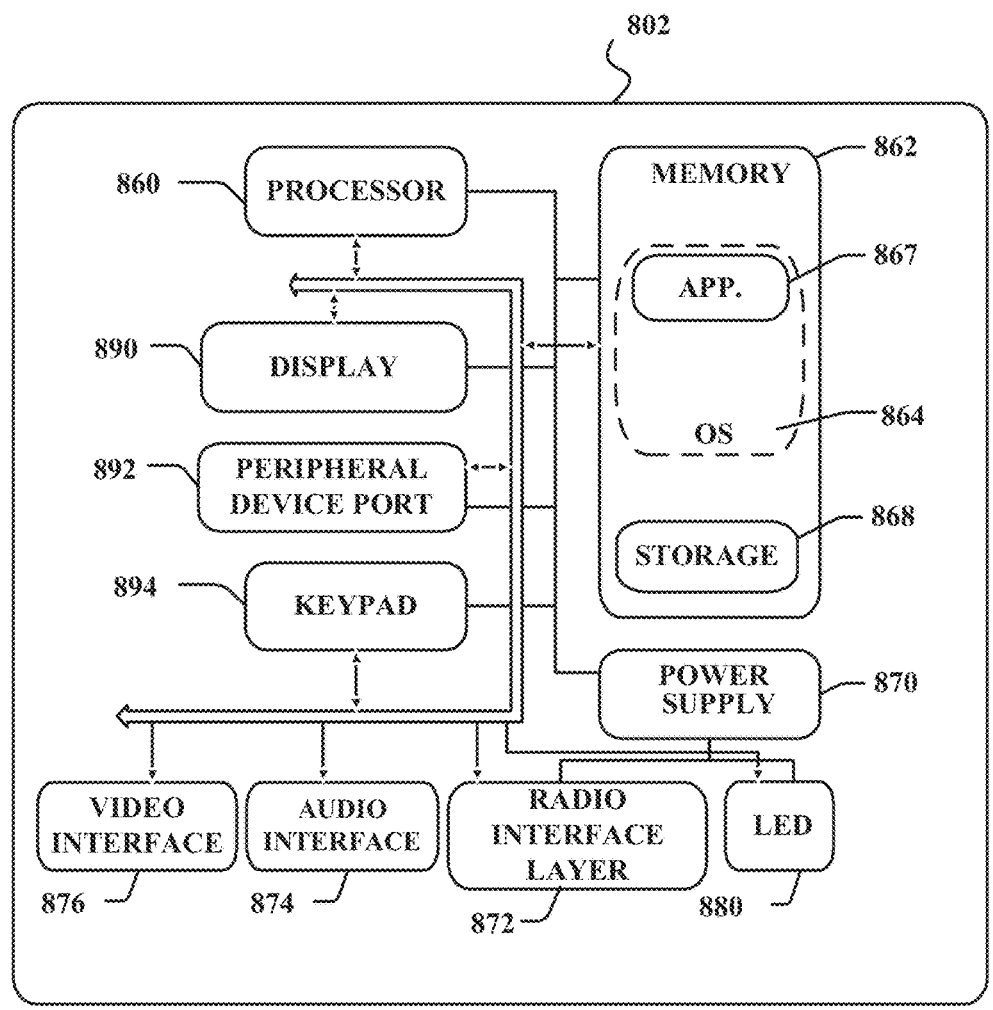
FIG. 8B is a simplified block diagram of a mobile computing device with which various embodiments may be practiced.

FIGS. 8A and 8B illustrate a suitable mobile computing environment, for example, a mobile computing device 850 which may include, without limitation, a smartphone, a tablet personal computer, a laptop computer, and the like, with which various embodiments may be practiced. With reference to FIG. 8A, an example mobile computing device 850 for implementing the embodiments is illustrated. In a basic configuration, mobile computing device 850 is a handheld computer having both input elements and output elements. Input elements may include touch screen display 825 and input buttons 810 that allow the user to enter information into mobile computing device 850. Mobile computing device 850 may also incorporate an optional side input element 820 allowing further user input. Optional side input element 820 may be a rotary switch, a button, or any other type of manual input element. In alternative embodiments, mobile computing device 850 may incorporate more or less input elements. For example, display 825 may not be a touch screen in some embodiments. In yet another alternative embodiment, the mobile computing device is a portable telephone system, such as a cellular phone having display 825 and input buttons 810. Mobile computing device 850 may also include an optional keypad 805. Optional keypad 805 may be a physical keypad or a "soft" keypad generated on the touch screen display.

Mobile computing device 850 incorporates output elements, such as display 825, which can display a graphical user interface (GUI). Other output elements include speaker 830 and LED light 826. Additionally, mobile computing device 850 may incorporate a vibration module (not shown), which causes mobile computing device 850 to vibrate to notify the user of an event. In yet another embodiment, mobile computing device 850 may incorporate a headphone jack (not shown) for providing another means of providing output signals.

Although described herein in combination with mobile computing device 850, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 8B is a block diagram illustrating components of a mobile computing device used in one embodiment, such as the mobile computing device 850 shown in FIG. 8A. That is, mobile computing device 850 can incorporate a system 802 to implement some embodiments. For example, system 802 can be used in implementing a "smart phone" or tablet computer that can run one or more applications similar to those of a desktop or notebook computer. In some embodiments, the system 802 is integrated as a computing device, such as an integrated personal digital assistant (PDA) and wireless phone.

Application 867 may be loaded into memory 862 and run on or in association with an operating system 864. The system 802 also includes non-volatile storage 868 within memory the 862. Non-volatile storage 868 may be used to store persistent information that should not be lost if system 802 is powered down. The application 867 may use and store information in the non-volatile storage 868. A synchronization application (not shown) also resides on system 802 and is programmed to interact with a corresponding synchronization application resident on a host computer to keep the information stored in the non-volatile storage 868 synchronized with corresponding information stored at the host computer. As should be appreciated, other applications may also be loaded into the memory 862 and run on the mobile computing device 850.

The system 802 has a power supply 870, which may be implemented as one or more batteries. The power supply 870 might further include an external power source, such as an AC adapter or a powered docking cradle that supplements or recharges the batteries.

The system 802 may also include a radio 872 (i.e., radio interface layer) that performs the function of transmitting and receiving radio frequency communications. The radio 872 facilitates wireless connectivity between the system 802 and the "outside world," via a communications carrier or service provider. Transmissions to and from the radio 872 are conducted under control of OS 864. In other words, communications received by the radio 872 may be disseminated to the application 867 via OS 864, and vice versa.

The radio 872 allows the system 802 to communicate with other computing devices, such as over a network. The radio 872 is one example of communication media. The embodiment of the system 802 is shown with two types of notification output devices: an LED 880 that can be used to provide visual notifications and an audio interface 874 that can be used with speaker 830 to provide audio notifications. These devices may be directly coupled to the power supply 870 so that when activated, they remain on for a duration dictated by the notification mechanism even though processor 860 and other components might shut down for conserving battery power. The LED 880 may be programmed to remain on indefinitely until the user takes action to indicate the powered-on status of the device. The audio interface 874 is used to provide audible signals to and receive audible signals from the user. For example, in addition to being coupled to speaker 830, the audio interface 874 may also be coupled to a microphone (not shown) to receive audible input, such as to facilitate a telephone conversation. In accordance with embodiments, the microphone may also serve as an audio sensor to facilitate control of notifications. The system 802 may further include a video interface 876 that enables an operation of on-board camera 840 to record still images, video streams, and the like.

A mobile computing device implementing the system 802 may have additional features or functionality. For example, the device may also include additional data storage devices (removable and/or non-removable) such as, magnetic disks, optical disks, or tape. Such additional storage is illustrated in FIG. 8B by storage 868.

Data/information generated or captured by the mobile computing device 850 and stored via the system 802 may be stored locally on the mobile computing device 850, as described above, or the data may be stored on any number of storage media that may be accessed by the device via the radio 872 or via a wired connection between the mobile computing device 850 and a separate computing device associated with the mobile computing device 850, for example, a server computer in a distributed computing network such as the Internet. As should be appreciated such data/information may be accessed via the mobile computing device 850 via the radio 872 or via a distributed computing network. Similarly, such data/information may be readily transferred between computing devices for storage and use according to well-known data/information transfer and storage means, including electronic mail and collaborative data/information sharing systems.

Figure 9:
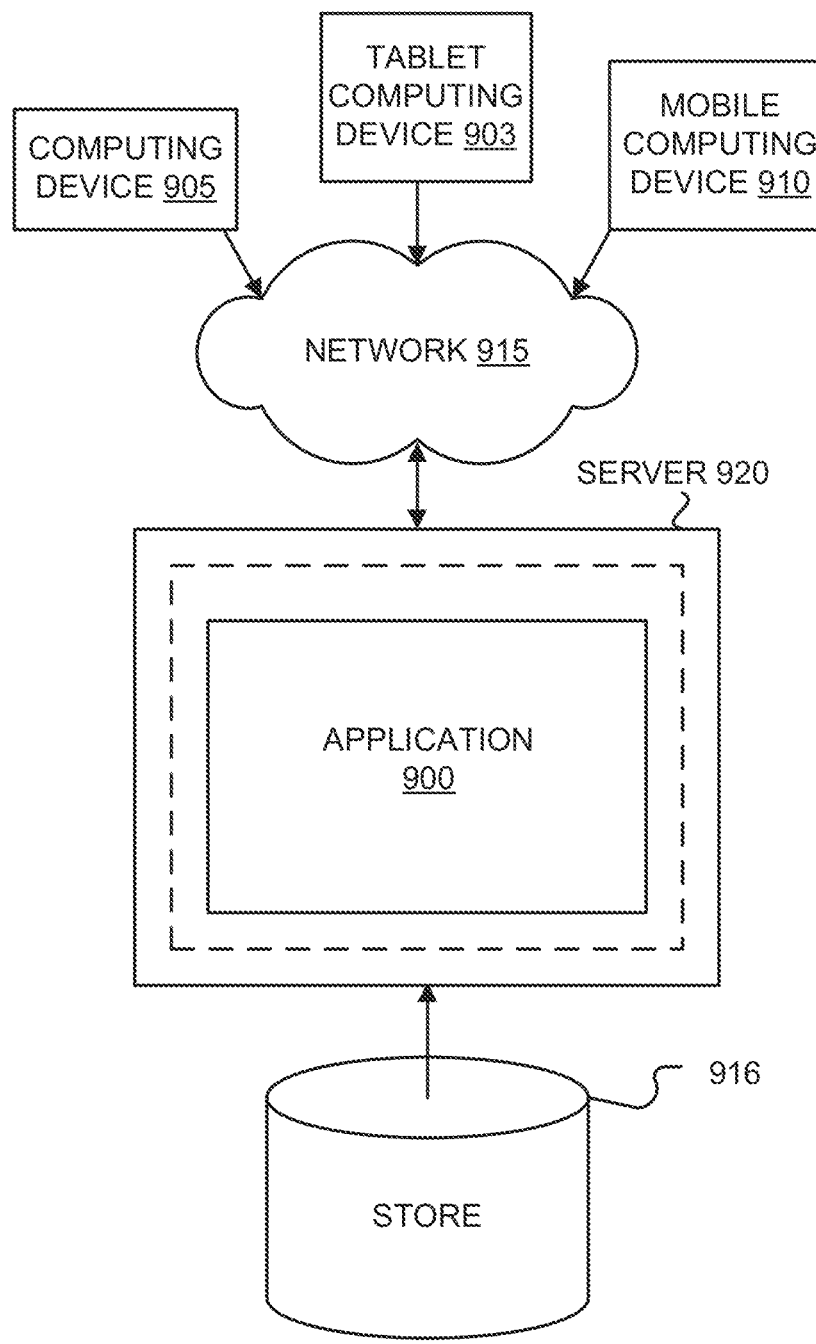
FIG. 9 is a simplified block diagram of a distributed computing system in which various embodiments may be practiced.

FIG. 9 is a simplified block diagram of a distributed computing system in which various embodiments may be practiced. The distributed computing system may include number of client devices such as a computing device 905, a tablet computing device 903 and a mobile computing device 910. The client devices 905, 903 and 910 may be in communication with a distributed computing network 915 (e.g., the Internet). A server 920 is in communication with the client devices 905, 903 and 910 over the network 915. The server 920 may store application 900 which may be perform routines including, for example, one or more of the operations in the routine 600 described above.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routine's operations may be modified in any manner, including by reordering operations and/or inserting or operations, without departing from the embodiments described herein.

It will be apparent to those skilled in the art that various modifications or variations may be made without departing from the scope or spirit of the embodiments described herein. Other embodiments will be apparent to those skilled in the art from consideration of the specification and practice of the embodiments described herein.

What is claimed is:

1. A computer-implemented method comprising:
generating a teaser from a portion of content in an electronic document associated with an application, wherein the teaser is a visual depiction that provides a preview of the electronic document;
associating the teaser with a ribbon that provides command control for the application;
displaying the teaser in the ribbon through a graphical user interface of the application;
receiving a selection of a refresh control within the ribbon, wherein the refresh control is configured to update the teaser;
in response to receiving the selection of the refresh control, generating an updated teaser, wherein the updated teaser is an updated visual depiction that provides an updated preview of the electronic document, wherein when the electronic document has been updated, the updated teaser is based on updated content in the electronic document and wherein when the electronic document has not been updated, the updated teaser is based on a different portion of content in the electronic document; and
displaying the updated teaser within the ribbon in place of the teaser.

2. The computer-implemented method according to claim 1, wherein the updated teaser is generated using updated content from the electronic document.

3. The computer-implemented method according to claim 1, wherein the portions of content used for generation of the one or more teasers are selected from a group consisting of: a filename, an author and a picture.

4. The computer-implemented method according to claim 1, wherein generating the teaser and the updated teaser includes generating a plurality of teasers from a plurality of portions of content in the electronic document, wherein displaying the teaser and the updated teaser includes displaying the plurality of generated teasers, and wherein the plurality of generated teasers are displayed in a horizontal scrolling gallery within the ribbon.

5. The computer-implemented method according to claim 4, wherein in response to receiving input indicating to minimize the ribbon, the computer-implemented method further comprising resizing the horizontal scrolling gallery to display a single button, and in response to receiving input indicating selection of the single button, the computer-implemented method further comprising displaying the horizontal scrolling gallery.

6. The computer-implemented method according to claim 1, wherein in response to receiving input indicating selection of the refresh control, the computer-implemented method further comprising re-organizing an arrangement of the plurality of generated teasers within the ribbon.

7. A system comprising:
at least one processor; and
a memory operatively connected with the processor, wherein the memory comprises computer-executable instructions that upon execution causes the processor to execute operations which comprise:
generating a teaser from a portion of content in an electronic document associated with an application, wherein the teaser is provides a visual preview of the electronic document,
associating the teaser with a ribbon that provides command control for the application,
displaying the teaser in the ribbon through a graphical user interface of the application,
receiving a selection of a refresh control within the ribbon, wherein the refresh control is configured to update the teaser,
in response to receiving the selection of the refresh control, regenerating the teaser to produce an updated teaser, wherein the updated teaser provides an updated visual preview of the electronic document that, if the electronic document has been updated with added content since the teaser was generated, incorporates the added content, and if the electronic document has not been updated with added content since the teaser was generated, the updated teaser is based on a different portion of content in the electronic document, and
displaying the updated teaser within the ribbon in place of the teaser.

8. The system according to claim 7, wherein the updated teaser is generated using updated content from the electronic document.

9. The system according to claim 7, wherein the portions of content used for generation of the at least one teaser are selected from a group consisting of: a filename, an author and a picture.

10. The computer-implemented method according to claim 7, wherein generating the teaser and the updated teaser includes generating a plurality of teasers from a plurality of portions of the content in the electronic document, wherein displaying the teaser and the updated teaser includes displaying the plurality of generated teasers, and wherein the plurality of generated teasers are displayed in a horizontal scrolling gallery within the ribbon.

11. The system according to claim 10, wherein in response to receiving input indicating to minimize the ribbon, the operations further comprise resizing the horizontal scrolling gallery to display a single button, and in response to receiving input indicating selection of the single button, the operations further comprise displaying the horizontal scrolling gallery.

12. The system according to claim 7, wherein in response to receiving input indicating selection of the refresh control, the operations further comprise re-organizing an arrangement of the plurality of generated teasers within the ribbon.

13. A computer-readable storage medium comprising computer executable instructions which, when executed by a computer, causing the computer to perform a method comprising:
 generating a teaser from a portion of content in an electronic document associated with an application, wherein the teaser is a visual depiction that provides a preview of the electronic document;
 displaying, through a graphical user interface of the application, the teaser in a ribbon that provides command control for the application;
 in response to receiving input in the ribbon selecting a refresh control that is configured to refresh display of the teaser, re-generating the teaser to produce an updated preview of the electronic document, wherein when the electronic document has been updated with additional content to the content used to generate the teaser, the updated preview is based on the additional content and wherein when the electronic document has not been updated since generation of the teaser, the updated preview is based on a different portion of the content of the electronic document; and
 displaying the re-generated teaser in the ribbon.

14. The computer-readable storage medium according to claim 13, wherein the re-generated one or more teasers is generated using updated content from the electronic document.

15. The computer-readable storage medium according to claim 13, wherein generating the teaser and the updated teaser includes generating a plurality of teasers from a plurality of portions of content in the electronic document, wherein displaying the teaser and the updated teaser includes displaying the plurality of generated teasers, and wherein the plurality of generated teasers are displayed in a horizontal scrolling gallery within the ribbon.

16. The computer-readable storage medium according to claim 15, in response to receiving input indicating to minimize the ribbon, the operations further comprise resizing the horizontal scrolling gallery to display a single button, and in response to receiving input indicating selection of the single button, the operations further comprise displaying the horizontal scrolling gallery.

17. The computer-readable storage medium according to claim 13, wherein in response to receiving input indicating selection of the refresh control, the method further comprising re-organizing an arrangement of the plurality of generated teasers within the ribbon.

18. The computer-implemented method according to claim 1, wherein generating the teaser and the updated teaser includes generating a plurality of teasers from a plurality of portions of content in the electronic document, wherein displaying the teaser and the updated teaser includes displaying the plurality of generated teasers, and wherein the plurality of generated teasers are displayed in a gallery arranged in a grid that drops down from the ribbon.

19. The system according to claim 7, wherein generating the teaser and the updated teaser includes generating a plurality of teasers from a plurality of portions of content in the electronic document, wherein displaying the teaser and the updated teaser includes displaying the plurality of generated teasers, and wherein the plurality of generated teasers are displayed in a gallery arranged in a grid that drops down from the ribbon.

20. The computer-readable storage medium according to claim 13, wherein generating the teaser and the updated teaser includes generating a plurality of teasers from a plurality of portions of content in the electronic document, wherein displaying the teaser and the updated teaser includes displaying the plurality of generated teasers, and wherein the plurality of generated teasers are displayed in a gallery arranged in a grid that drops down from the ribbon.

* * * * *